C. L. WALTER.
BALING APPARATUS.
APPLICATION FILED MAY 12, 1913.
1,090,257.
Patented Mar. 17, 1914.
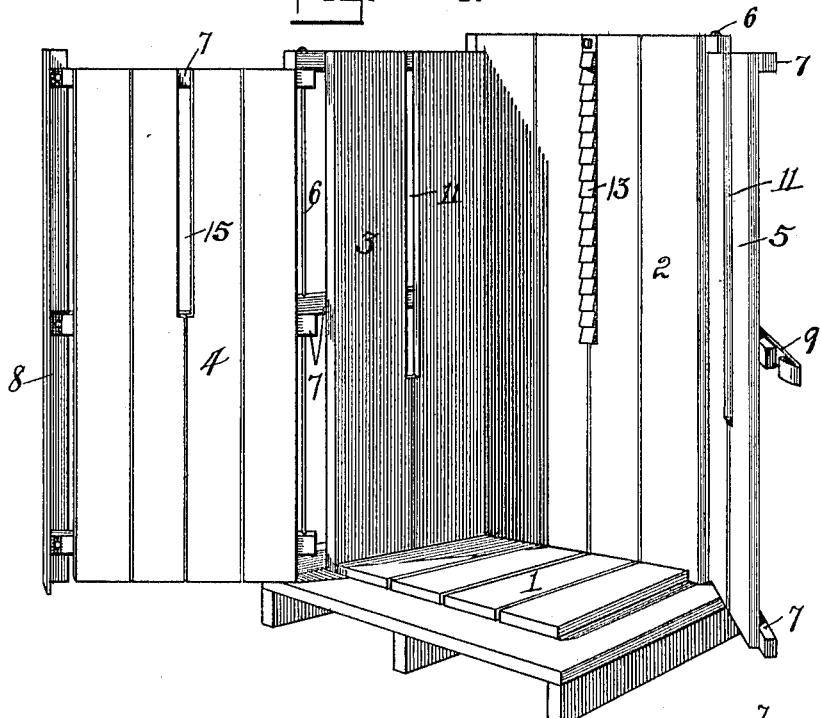
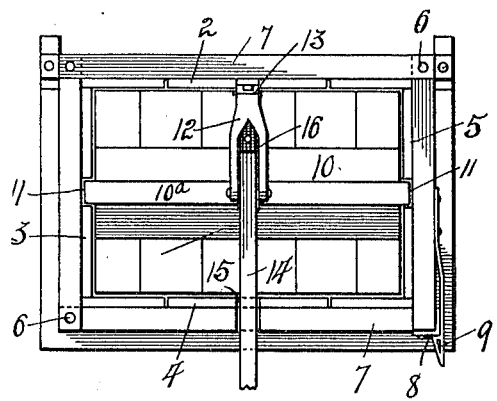
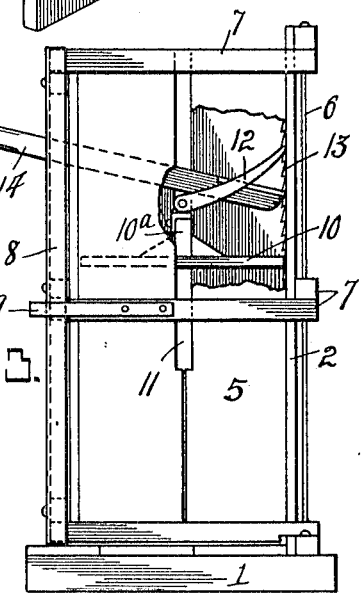
WITNESSES:
C. H. Bills.
D. C. Walter
INVENTOR.
Charles L. Walter,
By Owen & Owen,
His attys.

UNITED STATES PATENT OFFICE.

CHARLES L. WALTER, OF BASCOM, OHIO, ASSIGNOR TO THE MONARCH MANUFACTURING COMPANY, OF BASCOM, OHIO, A CORPORATION OF OHIO.

BALING APPARATUS.

1,090,257. Specification of Letters Patent. Patented Mar. 17, 1914.

Application filed May 12, 1913. Serial No. 767,086.

*To all whom it may concern:*

Be it known that I, CHARLES L. WALTER, a citizen of the United States, and a resident of Bascom, in the county of Seneca and State of Ohio, have invented a certain new and useful Baling Apparatus; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.
This invention relates to baling apparatus, and is particularly intended for use in connection with the baling of loose or scrap paper, but is not restricted to such use as it may be used for any purpose for which it may be adapted or appropriate.

The object of my invention is the provision of an improved baler of the character described, which is simple and strong in its construction, and has adjoining sides thereof hinged at their outer edges to enable them to be opened to facilitate a removal of baled matter from the apparatus, and which have their adjacent or meeting edges adapted to interlock in a rigid and secure manner whereby to enhance the practicability and commercial value of apparatus of this class.

Further objects and advantages of the invention will be apparent from the following description.
The invention is fully described in the following specification, and while, in its broader aspect, it is capable of embodiment in numerous forms, a preferred embodiment thereof is illustrated in the accompanying drawings, in which,—

Figure 1 is a perspective view of a baling apparatus embodying the invention with the hinged sides thereof in open position and the pressure-head removed. Fig. 2 is a top plan view thereof with the hinged sides closed and with the pressure-head in operative position therein, and Fig. 3 is a side elevation thereof with a part broken away.
Referring to the drawings, 1 designates the base of the apparatus from which rigidly rise the back 2 and one side 3. The front 4 and other side 5 of the apparatus are hinged at their outer edges to the free or outer edges of the side 3 and back 2, respectively, as by the projection of a pivot rod 6 through the extended ends of the cross-pieces 7 on the front, back and sides of the baler frame. An angle iron strip 8 is secured to the outer or free vertical edge of the front 4, being riveted, bolted or otherwise suitably fastened to the front or free end extensions of the cross-pieces 7 of the front, and has one of its flanges lapping the outer side edge of the front and its other flange extending inwardly at right angles thereto. When the hinged members 4 and 5 are in closed position the extended free or forward ends of the cross-pieces 7 of the member 5 are intended to fit within the side or inwardly projecting flange of the angle-iron strip 8, as indicated in Fig. 2, whereby such strip resists an outward or opening movement of the member 5 from closed position. It will be noted that the cross-pieces 7 of the side member 5 are so positioned relative to the positions of the cross-pieces 7 of the member 4 that their outer or free ends vertically lap each other so that the ends of the cross-pieces of the member 5 are permitted to abut against the front flange of the strip 8 when the hinged members are in closed interlocking position. A spring catch finger 9 is secured, in the present instance, to one of the cross-pieces 7 of the member 5, and is adapted to have hooked engagement with the side or corner portion of the angle-iron strip 8 when the hinged members are in the closed or interlocked position shown in Fig. 2, thus serving to retain the members in interlocked position.

A pressure-head 10 is intended to be placed within the upper portion of the apparatus above paper or other matter which is placed therein to be baled, and this head is provided with a centrally-disposed cross-piece 10ª, the ends of which are extended to adapt them to project into registering vertically elongated guide-ways 11 in the sides 3 and 5. A pawl 12 is pivoted to the top of the cross-piece 10ª at its central portion, and is intended to extend rearwardly therefrom into position to engage the teeth of a vertical ratchet-bar 13, which is secured to the back 2 of the apparatus.

A ratchet-lever 14 has an end removably projected through a vertically-disposed center slot 15 in the upper portion of the hinged member 4 and then projected through an opening 16 in the pawl 12 with its nose in position to engage a tooth on the ratchet-bar 13. The lever is intended to have a downward bearing on the pivoted end of the pawl 12, or over the cross-bar 10ª so that a downward movement of the outer free end thereof will exert a downward pressure on the pressure-head. As the pressure-head is lowered the nose of the pawl 12 engages the successive teeth of the ratchet-bar to maintain the head in lowered position, and the lever may then be moved to engage a successive tooth on the ratchet-bar preparatory to applying additional pressure on the head. It will of course be understood that the lever 14 projects loosely through the openings 15 and 16 of the members 4 and 12, respectively, so that it may be removed from or placed in operative position, as desired.

It is evident that I have provided a baler which is simple and easy to operate, and which has two adjoining sides thereof hinged at their outer edges to facilitate an easy removal of a bale from the apparatus and have their free or adjacent edges adapted to interlock in a simple and efficient manner to retain them in rigid closed relation.

I wish it understood that my invention is not limited to any specific construction or arrangement of the parts except in so far as such limitations are specified in the claim.

Having thus described my invention, what I claim as new, and desire to secure by Letters Patent, is,—

In an apparatus of the class described, a baler frame having a plurality of sides, a portion of which are mounted for opening movements, a pressure-head vertically movable in said frame, a pawl pivotally carried by said head, said pawl having an opening therethrough, a ratchet-bar fixed to one of the frame sides for coaction with said pawl to resist an upward movement of the pressure-head, and a ratchet-lever movably projected through one side of the frame and through the opening in said pawl with its nose in engagement with the ratchet-bar, said lever being adapted to have a downward bearing on the pressure-head without its ratchet-bar engaging end.

In testimony whereof, I have hereunto signed my name to this specification in the presence of two subscribing witnesses.

CHARLES L. WALTER.

Witnesses:
EDWARD C. MAY,
L. M. WHITE.

---

Copies of this patent may be obtained for five cents each, by addressing the "Commissioner of Patents, Washington, D. C."